Figure 1:
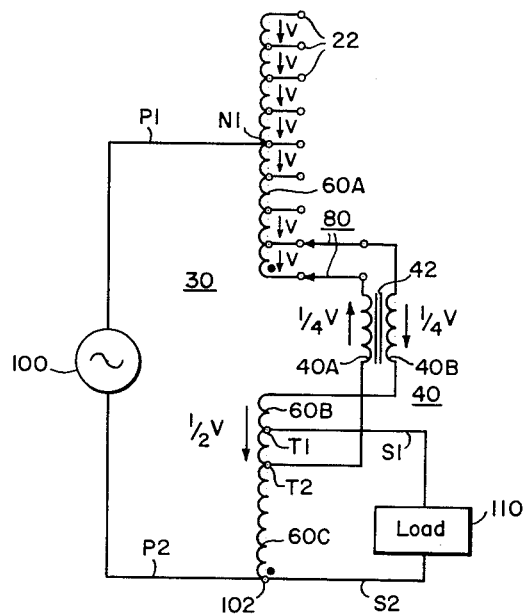

Dec. 26, 1961    T. E. ALVERSON    3,015,057
TRANSFORMER TAP CHANGING SYSTEM
Filed Jan. 6, 1960

WITNESSES
Edwin E. Buchler
Clement L. McHale

INVENTOR
Thomas E. Alverson
BY F. E. Browder
ATTORNEY

United States Patent Office 3,015,057
Patented Dec. 26, 1961

3,015,057
TRANSFORMER TAP CHANGING SYSTEM
Thomas E. Alverson, Sharon, Pa., assignor to Westinghouse Electric Corporation, East Pittsburgh, Pa., a corporation of Pennsylvania
Filed Jan. 6, 1960, Ser. No. 798
6 Claims. (Cl. 323—43.5)

This invention relates to apparatus for adjusting or regulating the voltage of alternating current electric circuits, and more particularly, to transformer tap changing systems.

In certain types of conventional voltage regulating or adjusting apparatus, such as step-type voltage regulators and tap changing transformers, a preventive reactor or autotransformer is commonly used to permit the transition from one tap position to another tap position of the equipment without interrupting the circuit which is normally completed by said equipment. In a conventional transformer tap changing system, the mid-tapped preventive autotransformer or reactor is normally short-circuited when the associated tap changing equipment is on certain positions while on other positions of said tap changing equipment, the preventive autotransformer or reactor bridges two transformer tap connections. When in the latter bridging position, the relatively high reactance of a conventional preventive autotransformer or reactor to circulating currents between the adjacent tap connections on the associated transformer winding prevents damage to said transformer winding, while its relatively low impedance to the load current permits operation on the latter position to obtain voltages which are substantially midway between the transformer tap connections.

The kva. rating of a conventional preventive autotransformer or reactor is determined by the load current which flows through said reactor and the voltage applied across said reactor when said reactor is in the bridging position. The latter voltage is normally substantially equal to the voltage between the adjacent tap connections on the associated transformer winding. Attempts have been made in the past, such as disclosed in U.S. Reissue Patent 21,854, to provide a satisfactory method of reducing the kva. rating of a conventional preventive autotransformer or reactor by reducing the voltage or potential applied to the reactor when said reactor is in the bridging position. The tap changing circuit in the patent just mentioned requires the use of several additional, separate windings on the tap changing transformer which would have to be insulated from the main winding of said transformer. It is, therefore, desirable to provide a transformer tap changing system in which the kva. rating of the preventive or bridging reactor is reduced by reducing the voltage or potential applied to said reactor in the bridging position and which has all of the advantages of the tap changing circuit disclosed in the above-mentioned patent as well as the additional advantage of eliminating the need for additional separate windings on the tap changing transformer.

It is an object of this invention to provide a new and improved transformer tap changing system.

Another object of this invention is to provide a transformer tap changing system in which the kva. rating of the bridging reactor included in said system is reduced.

A more specific object of this invention is to provide a transformer tap changing system in which the kva. rating of the bridging reactor is reduced without requiring additional separate windings on the associated tap changing transformer.

A further object of this invention is to provide a transformer tap changing system in which the reactive load introduced by the bridging reactor included in said system is substantially the same for all positions of the associated tap changing equipment.

Other objects of the invention will, in part, be obvious and will, in part, appear hereinafter.

Figure 2:
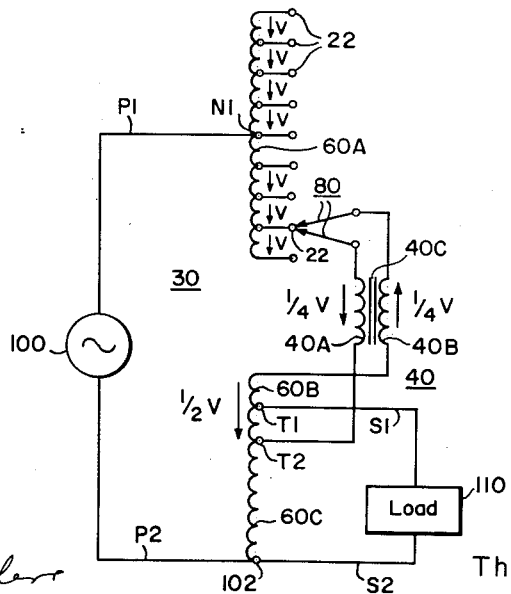

For a fuller understanding of the nature and objects of the invention, reference should be had to the following detailed description, taken in connection with the accompanying drawing, in which:

FIGURE 1 is a schematic diagram of circuits and apparatus in a transformer tap changing system embodying the teachings of the invention; and FIG. 2 is a schematic diagram of the transformer tap changing system shown in FIG. 1 for a different operating condition.

Referring now to the drawing and FIG. 1 in particular, an autotransformer 30 is illustrated which is connected to be supplied with electrical energy or power from a suitable source of alternating current, as indicated at 100, through the primary power circuit conductors P1 and P2 that are connected to the terminals N1 and 102, respectively, of said autotransformer and to deliver electric energy or power to a secondary or load circuit including the load 110 through the secondary circuit conductors S1 and S2. It is to be understood, however, that in certain applications, the source of alternating current 100 and the load 110 may be interchanged in a transformer tap changing system as disclosed.

In particular, the autotransformer 30 includes a first winding section 60A having a plurality of tap connections 22 which are electrically spaced apart from one another to provide substantially the same potential, as indicated at V, and the same number of turns between each adjacent pair of the tap connections 22 and a second winding section 60C having a fixed number of turns. As previously mentioned, the neutral terminal N1 of the first winding section 60A is connected to the source 100 at the power circuit conductor P1 while the lower terminal 102 of the second winding section 60C is connected to said source at the power circuit conductor P2. The first and second winding sections 60A and 60C, respectively, are both inductively disposed on a common magnetic core structure (not shown).

In order to selectively connect the second winding section 60C in circuit relation with the same or adjacent tap connections 22 of the first winding section 60A, the switching means or mechanism 80, which may be of any suitable type, is connected in circuit relation between the first and second winding sections 60A and 60C, respectively. The switching means 80 is shown in the bridging position with respect to the tap connections 22 in FIG. 1. In order to limit the circulating current which flows in the winding sections 60A and 60C of the autotransformer 30 during different operating conditions of the switching means 80, a bridging reactor 40, which is illustrated as being of the split type and which includes the first and second winding portions 40A and 40B, respectively, inductively disposed on a separate magnetic core structure 42, is connected in circuit relation between the switching means 80 and the second winding section 60C. It is to be noted that the upper end of each of the first and second winding portions 40A and 40B, respectively, of the reactor 40 is connected to a separate tap switch of the switching means 80. The turns of the first and second winding portions 40A and 40B, repsectively, of the reactor 40 are arranged to be substantially equal so that the potential or voltage across each of said winding portions is also substantially equal or the same.

In order to reduce the total potential applied to the first and second winding portions 40A and 40B, respectively, of the reactor 40 when the switching means 80 is in the bridging position as shown in FIG. 1, a means integral with the second winding section 60C, more specifically the winding portion 60B, is provided for introducing a potential in circuit relation with said switching means and said reactor which is substantially one-half the potential between each pair of the adjacent tap connections 22 of the first winding section 60A. The winding portion 60B is disposed at the upper end of the second winding section 60C and includes a mid-tap connection as indicated at T1 which is connected to the upper end of the load 110 through the secondary circuit conductor S1. The upper end of the winding portion 60B, which is the same as the upper end of the second winding section 60C, is connected to the lower end of the second winding portion 40B of the reactor 40 while the lower end of the winding portion 60B, as indicated at T2, is connected to the lower end of the first winding portion 40A of the reactor 40.

The number of turns in the winding portion 60B of the second winding section 60C is arranged to be substantially one-half the number of turns between the adjacent tap connections 22 of the first winding section 60A while the corresponding potential across the winding portion 60B is arranged to be substantially one-half the potential between each pair of the adjacent tap connections 22 of said first winding section, as indicated in FIG. 1. The voltage or potential across the winding portion 60B is substantially balanced or symmetrical with respect to the mid-tap connection T1 since the number of turns between said mid-tap connection and each end of the winding portion 60B is substantially the same. In other words, the potential between the upper end of the winding portion 60B and the mid-tap connection T1 is substantially equal to the potential between said mid-tap connection and the lower end of the winding portion 60B, as indicated at T2. Since the total potential across the winding portion 60B is substantially equal to one-half the potential between each pair of the adjacent tap connections 22 of the first winding section 60A, the potential between the mid-tap connection T1 of the winding portion 60B and each end of said winding portion is substantially equal to one-fourth of the potential between each pair of the adjacent tap connections 22 of said first winding section.

In the operation of the transformer tap changing system shown in FIG. 1, when the switching means 80 is in the bridging position as shown in FIG. 1, the potential across the winding portion 60B of the second winding section 60C is of such polarity as to oppose or be out of phase with the potential between the adjacent pair of tap connections 22 to which the switching means 80 is connected. The total potential across the first and second winding portions 40A and 40B of the reactor 40 is, therefore, equal to the difference between the potential between the adjacent pair of tap connections 22 of the first winding section 60A to which the switching means 80 is connected and the potential across the winding portion 60B of the second winding section 60C which is equal to one-half the former potential. The latter total potential across the first and second winding portions 40A and 40B of the reactor 40 is substantially equal to one-half the potential between the adjacent pair of tap connections 22 on the first winding section 60A to which the switching means 80 is connected. Since the potential across each of the first and second winding portions 40A and 40B of the reactor 40 is substantially the same, the potential across each of said winding portions is substantially equal to one-fourth the potential between the adjacent pair of tap connections 22 of the first winding section 60A to which the switching means 80 is connected. In addition, since the total potential applied to the first and second winding portions 40A and 40B of the reactor 40 is substantially equal to one-half the potential between the adjacent pair of tap connections 22 on the first winding section 60A, to which the switching means 80 is connected the kva. rating of the reactor 40 is correspondingly reduced to substantially one-half that of a conventional preventive autotransformer reactor which is subjected to the total potential between the adjacent tap connections on an associated transformer winding.

On the other hand, as best shown in FIG. 2, when the switching means 80 connects the second winding section 60C to the same tap connection 22 of the first winding section 60A, the potential applied to the first and second winding portions 40A and 40B of the reactor 40 is due solely to the potential across the winding portion 60B of the second winding section 60C. Since the potential across the winding portion 60B is still one-half the potential between each pair of the adjacent tap connections 22 of the first winding section 60A, the total potential applied to the first and second winding portions 40A and 40B, respectively of the reactor 40 is still substantially equal to one-half the potential between each pair of the adjacent tap connections 22 of said first winding section for the new non-bridging position of the switching means 80. The potential across the first winding portion 40A is substantially equal to the potential across the second winding portion 40B of the reactor 40 and is therefore substantially equal to one-fourth the potential between each pair of adjacent tap connections of the first winding section 60A. Since the circulating current and the potential across the first and second winding portions 40A and 40B, respectively, of the reactor 40 is the same for both the bridging and nonbridging positions of the switching means 80, the reactive load introduced by the transformer tap changing system due to the bridging reactor 40 is the same for all positions of the switching means 80, thus eliminating the inequalities in voltage steps between the different tap connections 22 of the first winding section 60A which would otherwise be introduced by the bridging reactor 40.

It will be seen from a review of the operation of the transformer tap changing system shown in FIGS. 1 and 2 as just described that the potential applied to the winding portions of the reactor 40 is reduced to substantially a minimum value in the system as disclosed since by increasing or decreasing the number of turns in the winding portion 60B of the second winding section 60C and considering the corresponding changes in potential thereacross, that the total potential applied to the first and second winding portions 40A and 40B, respectively, of the reactor 40 would be increased in either the bridging position or the nonbridging position of the switching means 80 in the operation of the overall tap changing system as described.

It is to be noted that the turns of the first winding section 60A which are selected by the switching means 80 and effectively connected in series circuit relation with the turns of the second winding section 60C may be arranged to be either bucking or boosting with respect to the turns of said second winding section since the primary power circuit conductor P1 is connected to the neutral power terminal or connection N1 of the first winding section 60A. It is also to be noted that the voltage at the mid-tap connection T1 of the winding portion 60B and at the associated secondary power circuit conductor S1 corresponds to a voltage which is substantially midway between the associated tap connections 22 of the first winding section 60A when the switching means 80 is in the bridging position.

It is to be understood that a transformer tap changing system as disclosed may be employed with two winding transformers as well as with autotransformers as illustrated and with three-phase transformers rather than with single-phase units as illustrated. The operation of the switching means 80 may be controlled by any conventional type of manual or automatic control circuit to either regulate the voltage at the load 110 or to vary the voltage at the load 110 for any other purpose.

The circuits and apparatus embodying the teachings of this invention have several advantages. For example, the kva. rating of a bridging reactor included in a tap changer transformer system is reduced by reducing the potential applied to said reactor to substantially a minimum without requiring the use of additional separate windings on the associated transformer. Since the potential applied to the bridging reactor in a transformer tap changing system as disclosed is substantially the same for all the positions of the associated switching means, the reactive load introduced into the associated power circuit by the bridging reactor in a tap changing system as disclosed is substantially the same for all positions of the switching means included therein. Finally, since the potential applied to a bridging reactor in a transformer tap changing system as disclosed is reduced, the corresponding voltage which must be interrupted by the associated switching means is also reduced to a corresponding degree. It is important to note that since the tap changing system as disclosed does not require separate addditional windings on the associated transformer, the insulation which would otherwise be required to insulate such additional separate windings from the main winding of a transformer is not required and the insulation problems in a transformer in a tap changing system as disclosed are, therefore, greatly reduced.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a tap-changing system for transformers, a power circuit comprising a pair of conductors, a transformer winding energized from said power circuit, said winding having a first section with a plurality of tap connections arranged with the potential between adjacent tap connections substantially equal and a second section, switching means for selectively connecting said second section to the same or adjacent tap connections of said first section, a bridging reactor having first and second winding portions connected in circuit relation between said switching means and said second section, and means integral with said second section for introducing a potential in circuit relation with said switching means and said reactor which is substantially one-half the potential between the tap connections of said first section and of such polarity as to limit the total potential across the first and second portions of said reactor to substantially one-half the potential between the adjacent tap connections of said first section independently of whether said switching means connects said second section to the same or different tap connections.

2. In a tap-changing system for transformers, a power circuit comprising a pair of conductors, a transformer winding energized from said power circuit, said winding having a first section with a plurality of tap connections arranged with the potential between adjacent tap connections substantially equal and a second section, switching means for selectively connecting said second section to the same or adjacent tap connections of said first section, a bridging reactor having first and second winding portions connected in circuit relation between said switching means and said second section, and means integral with said second section for introducing a potential in circuit relation with said switching means and said reactor which is substantially one-half the potential between the tap connections of said first section and of such polarity as to limit the total potential across the first and second portions of said reactor to substantially one-half the potential between the adjacent tap connections of said first section independently of whether said switching means connects said second section to the same or different tap connections, the latter means comprising a mid-tapped portion of said second section, one end of each portion of said reactor being connected to one end of the latter mid-tapped portion.

3. In a tap changing system for transformers, a power circuit comprising a pair of conductors, a transformer having a winding energized from said power circuit, said winding including a first portion having a plurality of tap connections arranged to have the same potential difference between each adjacent pair thereof and a second portion having a fixed number of turns, a bridging reactor having first and second winding portions, switching means for selectively connecting one end of each winding portion of said reactor to the same or adjacent tap connections, the other ends of said reactor portions being connected across a mid-tapped section of the second portion of said transformer winding, the potential across said mid-tapped section being substantially one half the potential between the taps of the first portion of the transformer winding to limit the total potential across the first and second portions of said reactor to one-half the potential between the taps of the first portion of the transformer winding in all positions of the switching means.

4. In combination, a transformer winding including a first section having a plurality of tap connections arranged to have substantially the same potential between adjacent tap connections when said winding is energized and a second section having a mid-tapped portion at one end thereof, switching means for selectively connecting the mid-tapped portion of said second section across the same or adjacent tap connections of said first section, and a bridging reactor having first and second winding portions connected between each end of the mid-tapped portion of said second section and said switching means, the potential across said mid-tapped portion being substantially balanced with respect to its mid-tap, substantially equal to one-half the potential between the tap connections of said first section and of such polarity as to limit the potential across each portion of said reactor to one-fourth of the potential between the adjacent tap connections of said first section independently of the position of said switching means.

5. In combination, a primary power circuit, a transformer winding including a first section having a plurality of tap connections arranged to have substantially the same potential between adjacent tap connections and a second section having a mid-tapped portion at one end thereof, said winding being energized from said primary power circuit, switching means for selectively connecting the mid-tapped portion of said second section across one or an adjacent pair of the tap connections, a bridging reactor having first and second winding portions each having the same number of turns, said first and second winding portions of said reactor being each connected between one of the ends of said mid-tapped portion and said switching means, and a secondary circuit connected to the mid-tap of said mid-tapped portion of said second section, the balanced potential across said mid-tapped portion being substantially one-half the potential between the adjacent taps of said first section to limit the potential across each winding portion of said reactor to substantially one-fourth the potential between the adjacent tap connections of said first section.

6. In a tap-changing system for transformers, a power circuit comprising a pair of conductors, a transformer winding energized from said power circuit, said winding being disposed on a magnetic core and including a first section having a plurality of tap connections spaced from one another to provide substantially the same potential between adjacent tap connections and a second section having a mid-tapped portion at one end thereof, switching means for selectively connecting the mid-tapped portion of said second section across one or a pair of the tap connections of said first section, and a bridging reactor having first and second winding portions each having substantially the same number of turns disposed on a second magnetic core, said first and second winding portions each being connected to one end of said mid-tapped portion and said switching means, the potential across said mid-tapped portion being of such polarity and substantially one-half the potential between the adjacent tap connections of said first section as to limit the total potential across the first and second winding portions of said reactor to substantially one-half the potential between the adjacent tap connections of said first section.

References Cited in the file of this patent
UNITED STATES PATENTS

| | | |
|---|---|---|
| Re. 21,854 | Carson | July 15, 1941 |
| 2,342,084 | Lennox | Feb. 15, 1944 |